United States Patent [19]

Usui et al.

[11] Patent Number: 5,040,290
[45] Date of Patent: Aug. 20, 1991

[54] VEHICLE DOOR MOUNTING SYSTEM

[75] Inventors: Junichi Usui; Haruo Oda, both of Ohsaka; Shunji Sakamoto, Hiroshima; Hideyuki Kato, Hiroshima; Hisaaki Katsuki, Hiroshima; Tetsuya Maruta, Hiroshima, all of Japan

[73] Assignees: Mazda Motor Corporation, Hiroshima; Daifuku Co., Ltd., Ohsaka, both of Japan

[21] Appl. No.: 456,485

[22] Filed: Dec. 26, 1989

[30] Foreign Application Priority Data

Dec. 27, 1988 [JP] Japan ................ 63-330451

[51] Int. Cl.⁵ .......................................... B23P 21/00
[52] U.S. Cl. ...................... 29/787; 29/771; 29/795; 29/281.1
[58] Field of Search ............... 29/430, 431, 771, 784, 29/786, 791, 793, 794, 822, 823, 824, 281.1, 787, 795; 901/7, 8, 50; 414/225

[56] References Cited

U.S. PATENT DOCUMENTS

| | | | |
|---|---|---|---|
| 3,776,395 | 12/1973 | Lingg et al. | 198/465.2 |
| 4,627,158 | 12/1986 | Mitoh | 29/824 |
| 4,836,068 | 6/1989 | Erickson | 403/322 |
| 4,906,123 | 3/1990 | Weskamp et al. | 403/322 |

FOREIGN PATENT DOCUMENTS

62-167784 10/1987 Japan.
63-22778 1/1988 Japan.

Primary Examiner—P. W. Echols
Assistant Examiner—David P. Bryant
Attorney, Agent, or Firm—Sixbey, Friedman, Leedom & Ferguson

[57] ABSTRACT

A vehicle door mounting system mounts a door on a vehicle body by bringing a hinge member on the door into engagement with a hinge member on the vehicle body and inserting a hinge pin into hinge pin holes of the hinge members. The mounting system has a robot, and a door holding jig and a hinge pin inserting jig which are mounted on the robot. The robot is arranged so that it brings the door to a predetermined position with respect to the vehicle body where the hinge member on the door is engaged with the hinge member on the vehicle body while the door holding jig holds the door. The hinge pin inserting jig is separable from the door holding jig and is moved between an operative position where it inserts the hinge pin into the hinge pin holes and a hinge pin setting position where the hinge pin is set to the hinge pin inserting jig.

13 Claims, 6 Drawing Sheets

VEHICLE DOOR MOUNTING SYSTEM

BACKGROUND OF THE INVENTION

1. Field of the Invention

This invention relates to a vehicle door mounting system which mounts a vehicle door on a vehicle body by use of a robot.

2. Description of the Prior Art

In a conventional vehicle door mounting system, a door holding jig means and a hinge pin inserting jig means are mounted on a robot, and the robot holds a door with the door holding jig means and positions the door with respect to a vehicle body so that the hinge member on the door is engaged with the hinge member on the vehicle body, and then inserts a hinge pin into the engaged hinge members with the hinge pin inserting jig means.

As disclosed, for instance in Japanese Unexamined Patent Publication No. 63-22778, in the conventional door mounting system, the door holding jig and the hinge pin inserting jig are integrally connected and constantly mounted on the robot, while the hinge pin is set to the hinge member on the vehicle body before the door is set to the vehicle body.

However, such a door mounting system is disadvantageous in that, since the hinge pin has been set to the hinge member on the vehicle body when the door is set to the vehicle body, the robot, or the door holding jig or the hinge pin inserting jig on the robot can interfere with the hinge pin to break the hinge pin or to drop the hinge pin off the hinge member.

This problem can be overcome when the hinge pin is set to the hinge pin inserting jig which is mounted on the robot. However, in order to manually set the hinge pin to the hinge pin inserting jig which is mounted on the robot, the operator must close on the robot, which is not preferable in view of the safety. Further, when the hinge pin is set to the hinge pin inserting jig which is mounted on the robot, it is difficult to automate the setting of the hinge pin.

SUMMARY OF THE INVENTION

In view of the foregoing observations and description, the primary object of the present invention is to provide a vehicle door mounting system which is free from the aforesaid drawbacks inherent to the conventional systems and in which the hinge pin can be manually set to the hinge pin inserting jig with safety, and the setting of the hinge pin can be easily automated.

In accordance with the present invention, there is provided a vehicle door mounting system which mounts a door on a vehicle body by bringing a hinge member on the door into engagement with a hinge member on the vehicle body and inserting a hinge pin into hinge pin holes of the hinge members, the mounting system comprising a robot, and a door holding jig and a hinge pin inserting jig which are mounted on the robot, the robot being arranged so that it brings the door to a predetermined position with respect to the vehicle body where the hinge member on the door is engaged with the hinge member on the vehicle body while the door holding jig holds the door, the hinge pin inserting jig being separable from the door holding jig and being moved between an operative position where it inserts the hinge pin into the hinge pin holes and a hinge pin setting position where the hinge pin is set to the hinge pin inserting jig.

The hinge pin inserting jig may be mounted either directly on the robot or on the door holding jig. The hinge pin inserting jig may be moved to the hinge pin setting position by the robot itself or by other means which moves relative to the robot.

In accordance with the present invention, the hinge pin can be set to the hinge pin inserting jig manually with safety and the setting of the hinge pin can be easily automated, if desired, since the hinge pin may be set to the hinge pin inserting jig in the hinge pin setting position remote from the door holding jig and the robot body.

DESCRIPTION OF THE PREFERRED EMBODIMENT

Figure 1:
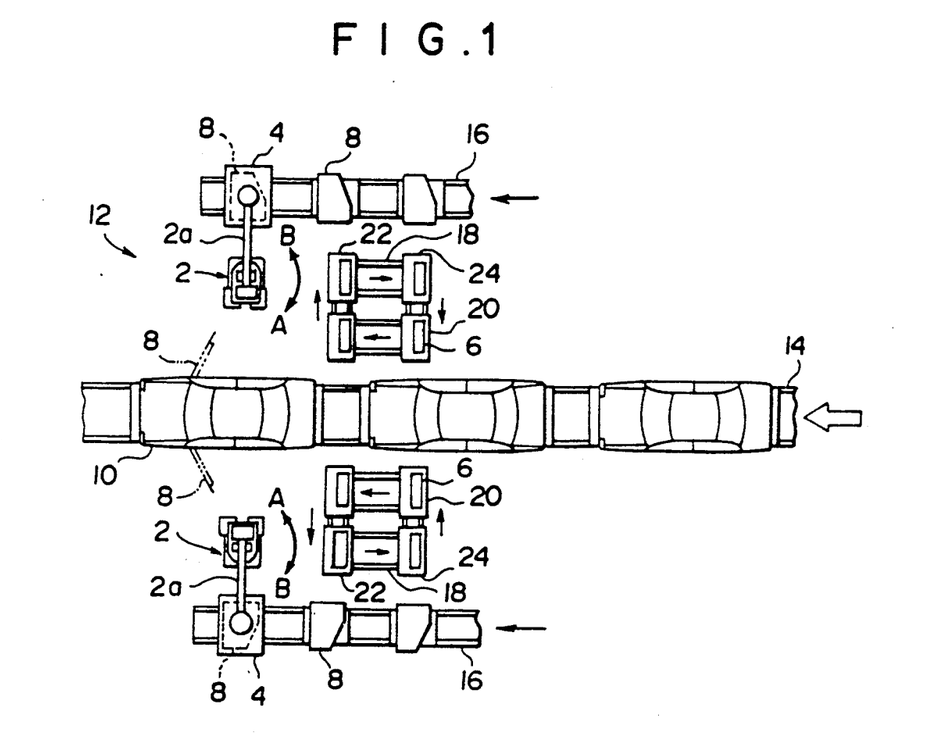
FIG. 1 is a schematic plan view showing a vehicle door mounting line in which a vehicle door mounting system in accordance with an embodiment of the present invention is employed.

In FIG. 1, a door mounting line is provided with a pair of door mounting systems in accordance with an embodiment of the present invention which are disposed on opposite sides of a vehicle body conveying line 14 at a door mounting station 12. Each of the door mounting systems comprises robot 2, and a door holding jig 4 and a hinge pin inserting jig 6 which are mounted on the robot 2. The door holding jig 4 and the hinge pin inserting jig 6 are separated from each other and the door holding jig 4 is normally held on the robot 2 while the hinge pin inserting jig 6 is mounted on and removed from the robot 2 each time a door 8 is mounted on a vehicle body 10.

The vehicle body conveying line 14 intermittently feeds the vehicle bodies 10 to the door mounting station 12 one at a time. A door conveying line 16 is disposed on each side of the vehicle body conveying line 14 and intermittently feeds the doors to the door mounting station 12 one at a time. A hinge pin inserting jig circulating line 18 is provided at the door mounting station 12 which circulates the hinge pin inserting jigs 6 each placed on a jig table 20 via a jig delivering and receiving position 22 and a hinge pin setting position 24. In the hinge pin setting position 24, a pair of hinge pins 122 (see FIG. 6, not shown in FIG. 1) are set to the hinge pin inserting jig 6 manually in this particular embodiment (though the hinge pins 122 may be set to the hinge pin inserting jig 6 by an automaton). Then the hinge pin inserting jig 6 with the hinge pins 122 is conveyed to the jig delivering and receiving position 22 by the hinge pin inserting jig circulating line 18, and is mounted on the door holding jig 4 in the following manner. The hinge pin inserting jig circulating line 18 receives the hinge pin inserting jig 6, which has inserted the hinge pins 122 into engaged hinge members 26 and 126 of the vehicle body 10 and the door 8, from the door holding jig 4 in the jig delivering and receiving position 22. Thereafter, the hinge pin inserting jig 6 is again conveyed to the hinge pin setting position 24, where another pair of hinge pins 122 are set to the hinge pin inserting jig 6.

The robot 2 has an arm 2a which is swung back and forth in the direction of arrow A and the direction of arrow B. The arm 2a is first swung to the jig delivering and receiving position 22 and the hinge pin inserting jig 6 with the hinge pins 122 is mounted on the door holding jig 4 held by the arm 2a. Then the robot 2 swings the arm 2a in the direction of arrow B and the door holding jig 4 receives the door 8 which has been fed to the door mounting station 12 by the door conveying line 16. Thereafter, the robot 2 swings the arm 2a and brings the door 8 held by the door holding jig 4 in a predetermined position with respect to the vehicle body 10 which has been fed to the door mounting station 12, thereby bringing the hinge members 126 on the door 8 into engagement with the hinge members 26 on the vehicle body 10 with the hinge holes in the respective hinge members in alignment with each other. Then the hinge pin inserting jig 6 operates and inserts the hinge pins 122 into the aligned hinge pin holes of the hinge members 126. After thus mounting the door 8 on the vehicle body 10, the robot 2 swings the arm 2a in the direction of arrow B to the jig delivering and receiving position 22, where the hinge pin inserting jig 6 is demounted from the door holding jig 4 and is placed on the jig table 20 which has been in the jig delivering and receiving position 22. Then the hinge pin inserting jig circulating line 18 feeds the jig tables 20 in the direction of the arrow so that the hinge pin inserting jig 6 which has just been placed on the jig table 20 by the robot 2 is fed to the hinge pin setting position 24 and the next jig table 20 on which another hinge pin inserting jig 6 has been placed is fed to the jig delivering and receiving position 22.

Figure 2:
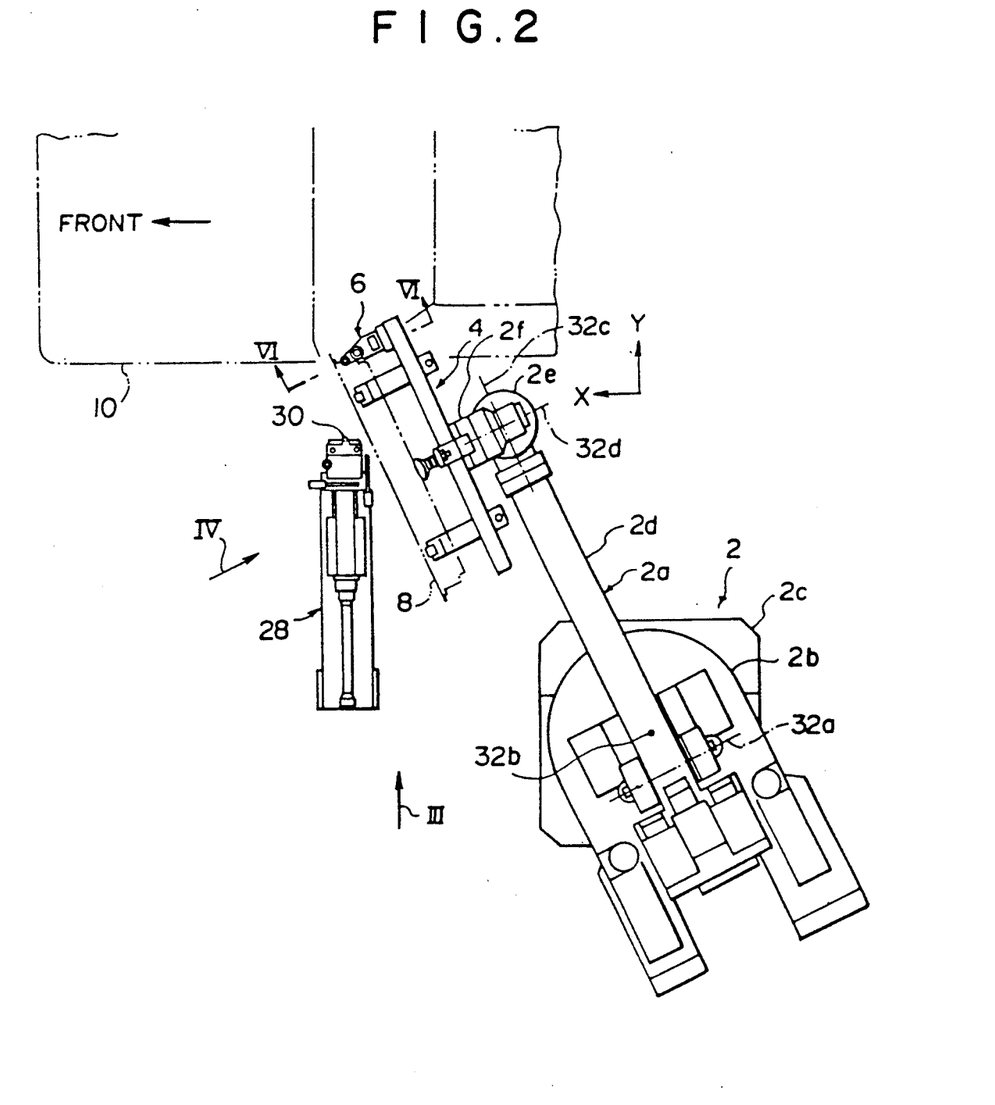
FIG. 2 is a schematic plan view showing the state that the door is positioned with respect to the vehicle door by the robot.
Figure 3:
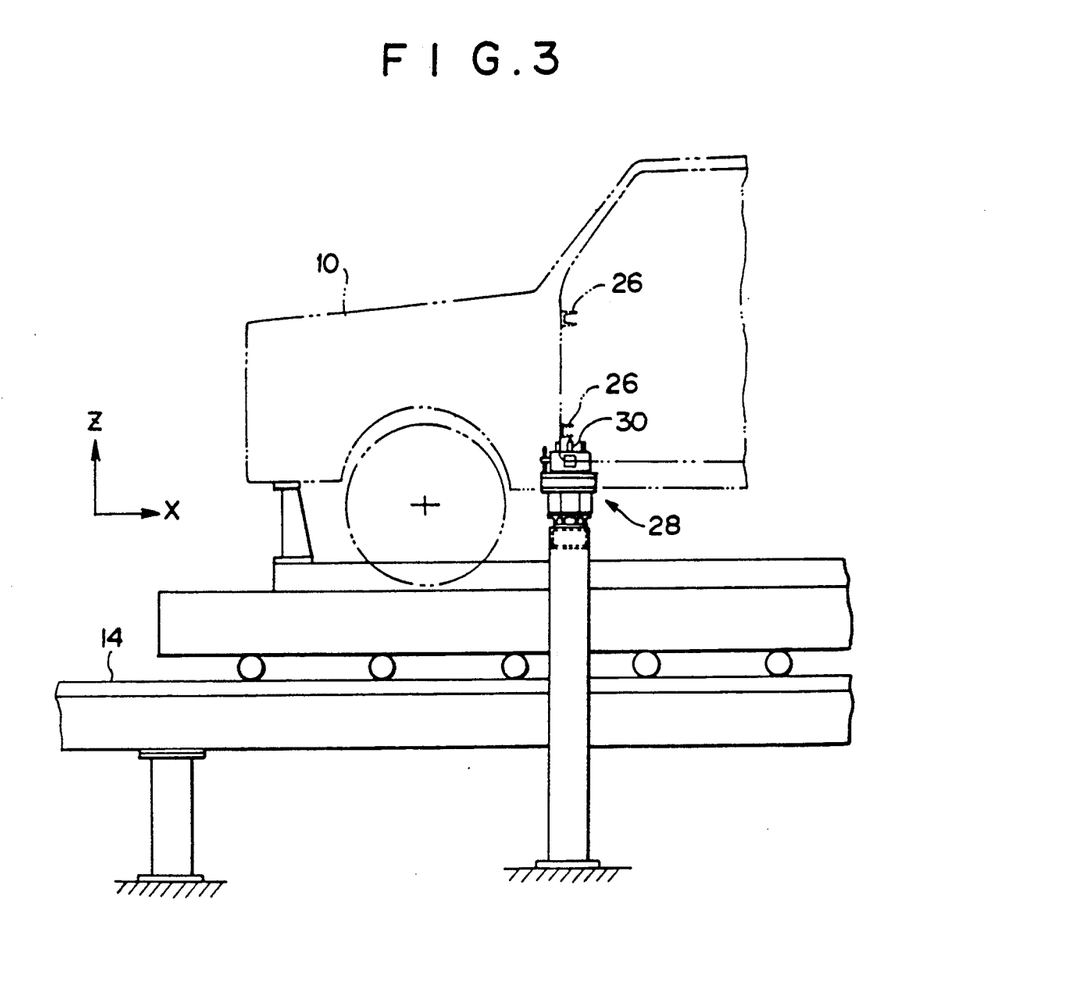
FIG. 3 is a view taken in the direction of arrow III in FIG. 2, with the door mounting system omitted.

In the state that the door 8 is positioned in the predetermined position with respect to the vehicle body 10 as shown in FIGS. 2 and 3, the door holding jig 4 has been held on the arm 2a of the robot 2 while the door 8 has been held by the door holding jig 4, and the hinge pin inserting jig 6 has been mounted on the door holding jig 4 with the hinge members 126 on the door 8 respectively engaged with the hinge members 26 on the vehicle body 10. When the robot 2 brings the door 8 to the predetermined position, a hinge pin hole position detecting means 28 detects the position of the hinge pin holes of the hinges 26 on the vehicle body 10, and the position of the hinge pin holes is input into the robot 2 and the robot 2 moves the door 8 on the basis of the position of the hinge pin holes so that the hinge members 126 on the door 8 are respectively engaged with the hinge members 26 on the vehicle body 10 with the hinge pin holes aligned with each other.

The hinge pin hole position detecting means 28 comprises a locating pin 30 having a tapered tip and moves the locating pin 30 from the position shown in FIG. 2 toward the vehicle body 10 to a position just below the hinge pin holes of the hinge members 26 on the vehicle body 10 as shown in FIG. 3, and then lifts it into the hinge pin holes. The hinge pin hole position is detected on the basis of the positions in X-, Y- and Z-directions and the inclination of the locating pin 30 to Z-direction when the locating pin 30 is in the hinge pin hole.

The arm 2a of the robot 2 is rotatable about an axis 32a relative to a support 2b which is rotatable about a vertical axis 32b relative to a base portion 2c. The arm 2a comprises a main portion 2d, a first end portion 2e and a second end portion 2f. The first end portion 2e is rotatable about an axis 32c relative to the main portion 2d, and the second end portion 2f is rotatable about an axis 32d relative to the first end portion 2e. The door holding jig 4 is mounted on the second end portion 2f.

The door holding jig 4 and the hinge pin inserting jig 6 will be described in detail with reference to FIGS. 4 to 6, hereinbelow.

Figure 4:
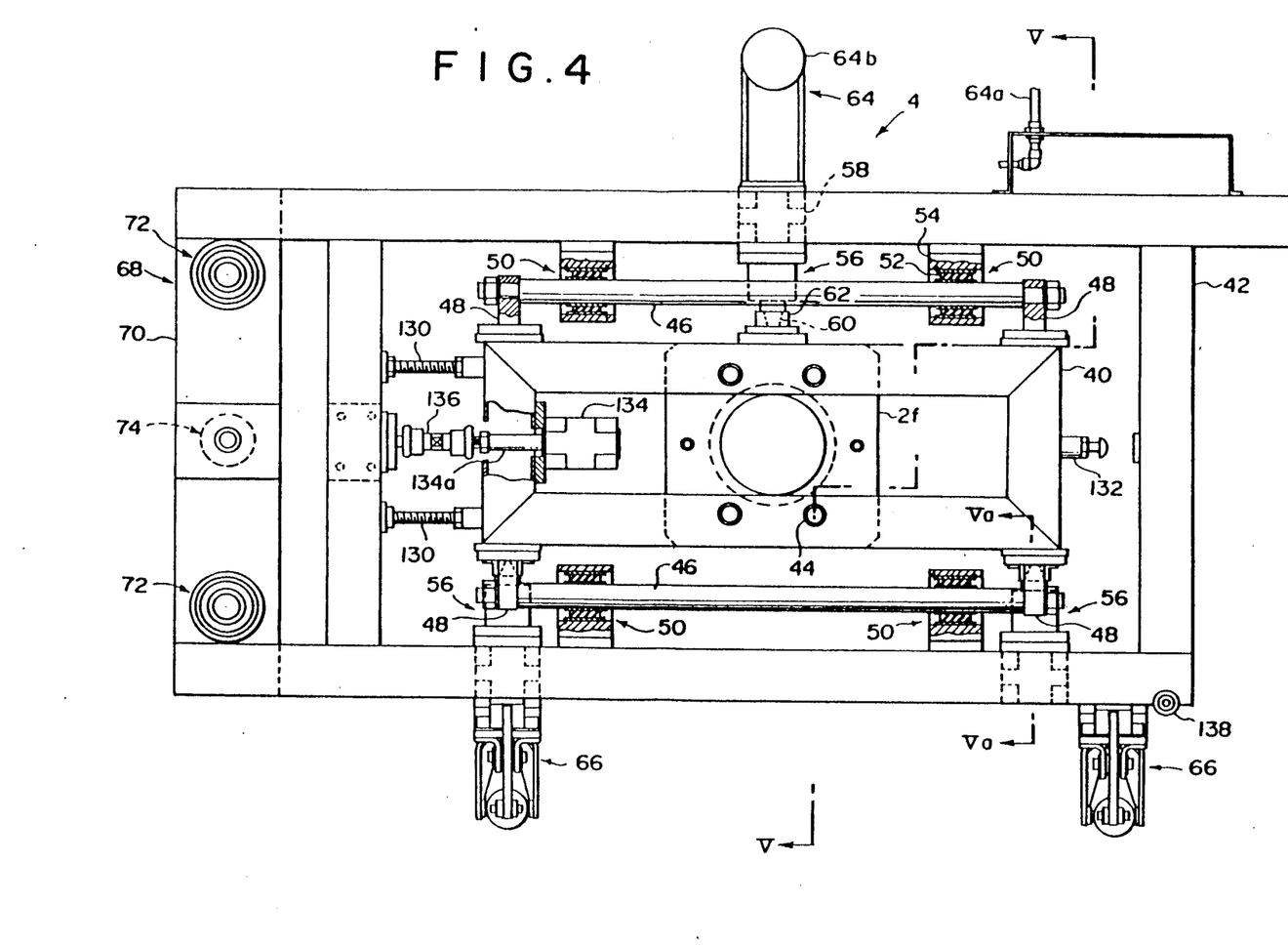
FIG. 4 is a view showing the door holding jig as viewed in the direction of arrow IV in FIG. 2.
Figure 5:
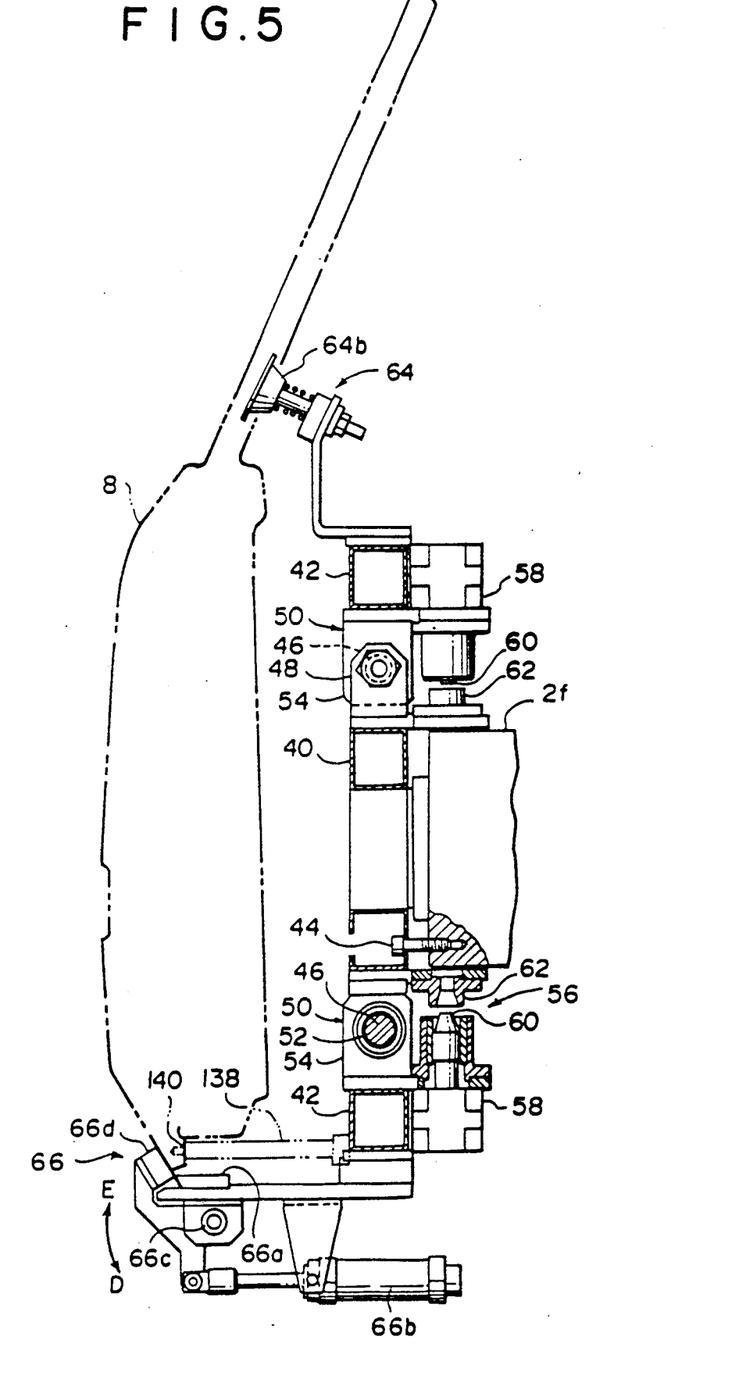
FIG. 5 is a cross-sectional view taken along line V—V in FIG. 4 with a cross-sectional view of the lock mechanism taken along line Va—Va.

As shown in FIGS. 4 and 5, the door holding jig 4 comprises a base frame 40 which is mounted on the robot 2 and a holding frame 42 which is supported on the base frame 40 in a floating fashion and holds the door 8.

The base frame 40 is fixed to the second end portion 2f of the arm 2a by four bolts 44. A pair of rods 46 is respectively disposed above and below the base frame 40. Each rod 46 is supported by a pair of supports 48 which are fixed to the base frame 40. The holding frame 42 is supported on the rods 46 by way of floating mechanisms 50. Each floating mechanism 50 has a rubber bushing 52 which comprises a tubular rubber, and inner and outer tubular members which are respectively fixed to the inner and outer surfaces of the tubular rubber. A pair of such floating mechanisms 50 are fit on each of the rods 46 so that they can slide along the rod 46. This, together with the resiliency of the rubber bushing 52, permits a certain displacement of the holding frame 42 relative to the base frame 40.

Three lock mechanisms 56, one at the middle of the upper side of the base frame 40 and the other two on left and right sides of the lower side of the base frame 40, fix the holding frame 42 in a predetermined position with respect to the base frame 40. Each lock mechanism 56 comprises an air cylinder 58, a lock pin 60 which has a tapered end portion and is moved back and forth by the air cylinder 58, and an engagement member 62 which is fixed to the base frame 40 and is engaged with the tapered end portion of the lock pin 60. When the lock pins 60 of the three lock mechanisms 56 are engaged with the corresponding engagement members 62 on the base frame 40 and pressed against the engagement member 62 under the force of the air cylinders 58, the holding frame 42 is positioned in the predetermined position with respect to the base frame 40.

A sucking means 64 and a pair of clampers 66 for holding the door 8 are provided on the holding frame 42. The sucking means 64 is mounted on the upper side of the holding frame 42 at the middle thereof, and the clampers 66 are mounted on left and right sides of the lower side of the holding frame 42. The sucking means 64 comprises a suction pad 64b which is connected to a vacuum source (not shown) by way of an air passage 64a and sucks the windowpane of the door 8 (FIG. 5). Each clamper 66 comprises a fixed clamp member 66a and a movable clamp member 66d which is rotated about a shaft 66c toward and away from the fixed clamp member 66a by an air cylinder 66b. The clamper 66 clamps the lower edge portion of the door 8 between the clamp members 66a and 66d.

A hinge pin inserting jig mounting portion 68 on which the hinge pin inserting jig 6 is mounted is provided on one side of the holding frame 42. As shown in FIGS. 4 and 6, the hinge pin inserting jig mounting portion 68 comprises a support plate 70 which is fixed to the holding frame 42, and a pair of connecting means 72 and a hinge pin inserting jig driving means 74 which are provided on the support plate 70. The connecting means 72 grip and releases a pair of mounting pins 106 which project from the hinge pin inserting jig 6. Each of the connecting means 72 comprises a sleeve 76 which has a flange portion 76a fixed to the support plate 70 and into which the mounting pin 106 is inserted, balls 78 which are held in the sleeve 76 so that they can move radially inward to engage with annular grooves 106a formed on the outer surface of the mounting pin 106, an air cylinder 80 which is fixed to the support plate 70, and a ball driving sleeve 84 which is connected to the cylinder rod 80a of the air cylinder 80 by way of connecting rods 82. The ball driving sleeve 84 is moved back and forth in the direction of arrow C between a pressing position in which it presses the balls 78 radially inward of the sleeve 76 and causes the balls 78 to engage with the annular grooves 106a on the mounting pin 106, and a releasing position in which it releases the balls 78 and permits them to disengage from the annular grooves 106a. The hinge pin inserting jig driving means 74 comprises a driving motor 86 fixed to the support plate 70, and a sleeve-like joint 88 which is drivingly engaged with the output shaft 86a of the driving motor 86 by way of splines, for instance. The joint 88 is drivingly engaged with an input shaft 92 by way of splines, for instance, when the hinge pin inserting jig 6 is mounted on the hinge pin inserting jig mounting portion 68 of the door holding jig 4.

Figure 6:
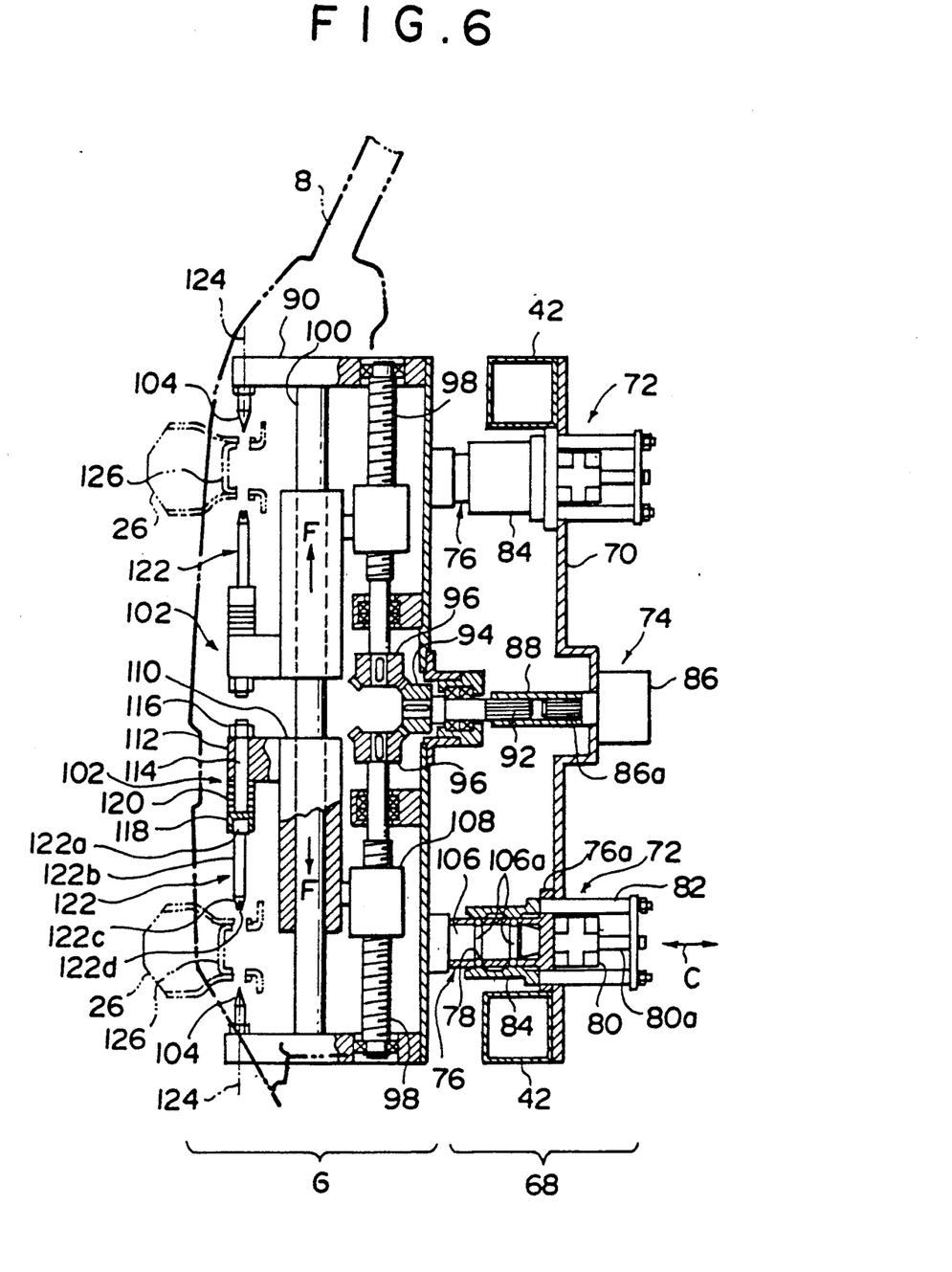
FIG. 6 is a cross-sectional view taken along line VI—VI in FIG. 2.

When mounting the hinge pin inserting jig 6 on the hinge pin inserting jig mounting portion 68, the robot 2 first causes the air cylinder 80 to move the ball driving sleeve 84 to the releasing position so that the balls 78 can freely move radially outward of the sleeve 76, and then moves the arm 2a so that the door holding jig 4 moves to fit the mounting pins 106 into the sleeves 76 as shown in FIG. 6. Then the robot 2 causes the air cylinder 80 to slide the ball driving sleeve 84 to the pressing position and thereby pressing the balls 78 radially inward of the sleeve 76 so that the balls 78 are engaged with the annular grooves 106a on the mounting pin 106 and held there. Simultaneously with the mounting pins' being inserted into the sleeves 76, the input shaft 92 is brought into engagement with the joint 88 of the hinge pin inserting jig driving means 74.

As shown in FIG. 6, the hinge pin inserting jig 6 comprises a frame 90, the input shaft 92 which is rotatably supported on the frame 90 and is driven by the driving motor 86 by way of the joint 88, a pair of screw rods 98 each of which is rotatably supported on the frame 90 and is rotated by the input shaft 92 by way of bevel gears 94 and 96, a guide rod 100 which is fixed to the frame 90, a pair of hinge pin inserting members 102 which are moved up and down along the guide rod 100, and wedge members 104 which are fixed to the frame 90 and force the bifurcated end portions of the hinge pin 122 away from each other. Each of the hinge pin inserting members 102 comprises a nut member 108 which is in mesh with the screw rod 98, a tubular member 110 which is fixed to the nut member 108 and is slidably fit on the guide rod 100, a pin member 114 which is slidably fit in an arm member 112 fixed to the tubular member 110, a nut 116 which is in mesh with one end portion of the pin member 114 and retains the pin member 114 in the arm member 112, a hinge pin holding member 118 which is formed of magnet and provided on the other end of the pin member 114, and a coned disc spring 120 which is disposed between the hinge pin holding member 118 and the nut 116.

The head 122a of the hinge pin 122 is attracted by the magnetic hinge pin holding member 118 and held there. The hinge pin 122 comprises the head 122a, a shank portion 122b and an end portion 122c which is bifurcated by a slit 122d.

The pin member 114 and the wedge member 104 of the hinge pin inserting member 102 are in alignment with each other on an axis 124 which is in parallel to the guide rod 100, and the hinge pin 122 is set to the hinge pin holding member 118 so that it extends along the axis 124. Further, when the door 8 is correctly held by the door holding jig 4, the hinge pin holes of the hinge pins 126 on the door 8 will extend along the axis 124.

In FIG. 4, reference numerals 130 and 132 denote a stopper which limits the lateral position of the holding frame 42 relative to the base frame 40. The base frame 40 is provided with a cylinder 134 having a cylinder rod 134a which is connected to the holding frame 42 by way of a rubber coupling 136. As shown in FIGS. 4 and 5, a reference pin 138 is fixed to the lower right corner of the holding frame 42. The purpose of the reference pin 138 will become apparent later.

When the door mounting system of this embodiment mounts the door 8 on the vehicle body 10, the robot 2 first swings the arm 2a and brings the door holding jig 4 to the jig delivering and receiving position 22 of the hinge pin inserting jig circulating line 18. Then the robot 2 mounts on the door holding jig 4 the hinge pin inserting jig 6 which has been positioned in the jig delivering and receiving position 22 and has been provided with the hinge pin 122.

Then the robot 2 swings the arm 2a in the direction of arrow B and the door holding jig 4 receives the door 8 which has been fed to the door mounting station 12 by the door conveying line 16. At the door mounting station 12, the door holding jig 4 is positioned in the predetermined position with respect to the door 8 by the arm 2a, and then the lock mechanisms 56 are released, i.e., the lock pins 60 are disengaged from the engagement members 62. At the same time, the movable clamp member 66d of each clamper 66 is swung away from the fixed clamp member 66a in the direction of arrow D in FIG. 5, and then the door holding jig 4 is moved toward the door 8 so that the reference pin 138 is inserted into a reference hole 140 formed in the inner surface of the door 8, thereby correctly positioning the door 8 with respect to the door holding jig 4. Thereafter, the movable clamp member 66d of each of the clampers 66 is moved toward the fixed clamp member 66a in the direction of arrow E in FIG. 5, thereby clamping the lower edge portion of the door 8, and at the same time, the sucking means 64 sucks the windowpane of the door 8. Then the lock mechanism 56 locks the holding frame 42 to the base frame 40, i.e., the lock pins 60 are pressed against the engagement members 62.

Then the robot 2 swings the arm 2a to bring the door 8 held by the door holding jig 4 to the predetermined position with respect to the vehicle body 10, where the hinge members 126 on the door 8 and the hinge members 26 on the vehicle body 10 are engaged with each other with the hinge pin holes therein in alignment with each other as shown in FIG. 6. If the hinge members 126 on the door 8 are inserted into the hinge members 26 on the vehicle body 10 by direct control of the arm 2a, the arm 2a must be extremely accurately controlled, which is very difficult. On the other hand, in accordance with this embodiment, the arm 2a brings the door side hinge members 126 into abutment against the body side hinge members 26 with a certain accuracy and the lock mechanisms 56 are released. Thereafter, the arm 2a forces the door side hinge members 126 into the body side hinge members 26. Since the door 8 can be displaced to some extent when the lock mechanisms 56 are released, the door side hinge members 126 can be smoothly inserted into the body side hinge members 26 under the guide of the arcuated corner thereof. Further even if the centers of the door side hinge members 126 are deviated from the centers of the body side hinge members 26 to some extent, the hinge pins 122 can be inserted since the door side hinge members 126 can be moved relative to the body side hinge members 26.

Thereafter, the robot 2 energizes the driving motor 86 and rotates the screw rods 98, thereby moving the hinge pin inserting members 102 in the direction of arrow F to insert the hinge pins 122 into the hinge pin holes of the body side hinge members 26 and the door side hinge members 126. When the bifurcated end portions 122c of the hinge pins 122 pass through the hinge members and the wedge members 104 are forced into the slits 122d, the end portions 122c are flared and the hinge pins 122 are retained on the hinge members.

Though, in the embodiment described, the door 8 is held by the door holding jig 4 after the hinge pin inserting jig 6 is mounted on the door holding jig 4, the door 8 may be held by the door holding jig 4 before the hinge pin inserting jig 6 is mounted on the door holding jig 4.

We claim:

1. A vehicle door mounting system which mounts a door on a vehicle body by bringing a hinge member on the door into engagement with a hinge member on the vehicle body and inserting a hinge pin into hinge pin holes of the hinge members, the mounting system comprising a robot, and a door holding jig and a hinge pin inserting jig which are mounted on the robot, the robot being arranged so that it brings the door to a predetermined position with respect to the vehicle body where the hinge member on the door is engaged with the hinge member on the vehicle body while the door holding jig holds the door, the hinge pin inserting jig being separable from the door holding jig and being movable between an operative position where it inserts the hinge pin into the hinge pin holes and a hinge pin setting position where the hinge pin is set to the hinge pin inserting jib, wherein said door holding jig has a first connecting means and said hinge pin inserting jig has a second connecting means so that the first and second connecting means releasably engage each other.

2. A vehicle door mounting system as defined in claim 1 in which said door is provided with upper and lower hinge members, the vehicle body is provided with corresponding upper and lower hinge members, and the hinge pin inserting jib has an upper and a lower hinge pin inserting member, each which inserts a hinge pin into the hinge pin holes of the upper and lower hinge members, respectfully, the lower hinge pin inserting member inserting the hinge pin into the hinge pin holes of the lower hinge members from above and the upper hinge pin inserting member inserting the hinge pin into the hinge pin holes of the upper hinge members from below.

3. A vehicle door mounting system as defined in claim 2 further comprising a hinge pin inserting jig circulating means which receives the hinge pin inserting jig from the robot, conveys it to the hinge pin setting position and delivers another hinge pin inserting jig with hinge pins set thereto.

4. A vehicle door mounting system as defined in claim 2 in which said door holding jig holds the door so as to permit a slight displacement of the door relative to the door holding jig.

5. A vehicle door mounting system as defined in claim 4 further comprising a locking means which fixes the door relative to the door holding jig until the robot brings the door to the predetermined position with respect to the vehicle body.

6. A vehicle door mounting system as defined in claim 2 in which said hinge pin inserting jig is mounted on the door holding jig.

7. A vehicle door mounting system as defined in claim 6 in which said hinge pin inserting jig comprises a screw rod means which is connected to the upper and lower hinge pin inserting members so that the upper and lower hinge pin inserting members are respectively moved upward and downward when the screw rod means is rotated in one direction by an actuator.

8. A vehicle door mounting system as defined in claim 4 in which said actuator is mounted on the door holding jig.

9. A vehicle door mounting system as defined in claim 7 in which said actuator is mounted on the door holding jig and is operatively connected to the screw rod means when the hinge pin inserting jig is mounted on the door holding jig.

10. A vehicle door mounting system as defined in claim 9 in which said hinge pin inserting jig is mounted on the door holding jig by means of a pair of sleeves and a pair of pins which are fit into the sleeves and held there by a pair of engaging means.

11. A vehicle door mounting system as defined in claim 10 in which each of said engaging means comprises a plurality of balls which are held on the sleeve so that they can be moved radially inward and outward of the sleeve, an annular groove formed on the outer surface of the pin member, and a ball driving means which forces the balls radially inward and brings them into engagement with the annular groove.

12. A vehicle door mounting system as defined in claim 1 in which said first and second connecting means comprise a sleeve and a pin, respectively.

13. A vehicle door mounting system as defined in claim 1 in which said door holding jig has a mount to which the robot is connected.

* * * * *